(12) United States Patent
Han et al.

(10) Patent No.: US 11,157,190 B2
(45) Date of Patent: Oct. 26, 2021

(54) METHOD, DEVICE AND COMPUTER PROGRAM PRODUCT FOR MANAGING RAID

(71) Applicant: EMC IP Holding Company LLC, Hopkinton, MA (US)

(72) Inventors: Geng Han, Beijing (CN); Jian Gao, Beijing (CN); Zhihui Qiu, Beijing (CN); Jibing Dong, Beijing (CN); Hongpo Gao, Beijing (CN); Tianshu Sun, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 162 days.

(21) Appl. No.: 16/507,313

(22) Filed: Jul. 10, 2019

(65) Prior Publication Data
US 2020/0026450 A1    Jan. 23, 2020

(30) Foreign Application Priority Data
Jul. 20, 2018 (CN) .......................... 201810804051.8

(51) Int. Cl.
*G06F 3/06* (2006.01)
(52) U.S. Cl.
CPC .......... *G06F 3/0644* (2013.01); *G06F 3/0619* (2013.01); *G06F 3/0689* (2013.01)
(58) Field of Classification Search
None
See application file for complete search history.

(56) References Cited

U.S. PATENT DOCUMENTS

| | | | |
|---|---|---|---|
| 6,346,954 B1* | 2/2002 | Chu | G06F 3/0605 711/114 |
| 10,740,020 B2 | 8/2020 | Shaoqin et al. | |
| 10,788,997 B2 | 9/2020 | Shaoqin et al. | |
| 10,949,314 B2 | 3/2021 | Shaoqin et al. | |
| 11,003,359 B2 | 5/2021 | Li et al. | |
| 2003/0182502 A1* | 9/2003 | Kleiman | G06F 3/0689 711/114 |
| 2006/0041782 A1* | 2/2006 | Ali | G06F 11/1662 714/6.22 |
| 2011/0246716 A1* | 10/2011 | Frame | G06F 11/1076 711/114 |

* cited by examiner

*Primary Examiner* — Charles J Choi
(74) *Attorney, Agent, or Firm* — BainwoodHuang

(57) ABSTRACT

Techniques manage redundant arrays of independent drives (RAID). The techniques involve: in response to a target stripe to be built in the RAID, determining, from a resource pool, whether there are spare extents associated with at least one system disk. The techniques further involve: in response to determining that there are spare extents associated with at least one system disk, determining an adjacent relationship of used extents associated with the at least one system disk within a RAID stripe. The techniques further involve: determining, based on the adjacent relationship and the spare extents, an extent for building the target stripe. Accordingly, the total number of the RAID stripes including extents associated with the system disks can be reduced significantly, and a balance can be achieved within spare extents associated with system disks and spare extents associated with user disks for building a RAID stripe.

19 Claims, 7 Drawing Sheets

■ RAID STRIPS NOT INCLUDING EXTENS ASSOCIATED WITH SYSTEM DISKS
▧ RAID STRIPS INCLUDING EXTENS ASSOCIATED WITH SYSTEM DISKS

METHOD, DEVICE AND COMPUTER PROGRAM PRODUCT FOR MANAGING RAID

CROSS-REFERENCE TO RELATED APPLICATION

This application claims priority to Chinese Patent Application No. CN201810804051.8, on file at the China National Intellectual Property Administration (CNIPA), having a filing date of Jul. 20, 2018, and having "METHOD, DEVICE AND COMPUTER PROGRAM PRODUCT FOR MANAGING RAID" as a title, the contents and teachings of which are herein incorporated by reference in their entirety.

FIELD

Embodiments of the present disclosure generally relate to data processing, and more specifically, to a method, a device and a computer program product for managing redundant arrays of independent disks.

BACKGROUND

Data throughput of a storage system can be improved remarkably by simultaneously storing and reading data on a plurality of disks with redundant arrays of independent disks (RAID). The speed attainable using RAID may be several times, dozens of times or even hundreds of times faster than the speed when a single drive is used. Mapped RAID is a new technology of RAID. Unlike the conventional RAID, the mapped RAID is built at the top of a pool comprised of a plurality of disks, rather than on several particular disks. A disk in the pool is divided into a series of non-overlapping segments each having a fixed size, these segments can be referred to as disk extents. Therefore, the pool can be regarded as a set of disk extent resources. The mapped RAID is comprised of a group of RAID stripes. Each RAID stripe can be taken as a conventional RAID.

Disks in a resource pool may include system disks and user disks. Particular spaces on system disks are reserved for storing software and metadata of some initial space of private management file systems. The rest of the space of the system disks may be user portions, and a user may create a mapped RAID group thereon to make fully use of the capacity of the system disks. However, since a part of credits in the system disks are dedicated to system IO processing, there are fewer credits left by the system disks for user IO processing. In this case, for example on the same RAID stripe, if extents on the stripe are extents associated with system disks, the speed for processing the user IO is lower than the speed of the extents associated with the user disks on the stripe for processing the user IOs, and such unbalance of processing capability can cause a system bottleneck and downgrade of the system.

SUMMARY

Embodiments of the present disclosure relate to a method, device and computer program product for managing redundant arrays of independent drives.

In a first aspect of embodiments of the present disclosure, there is provided a method of managing RAID. The method includes in response to a target stripe to be built in the RAID, determining, from a resource pool, whether there are spare extents associated with at least one system disk. The method also includes in response to determining that there are the spare extents associated with at least one system disk, determining an adjacent relationship of used extents associated with the at least one system disk within a RAID stripe. The method further includes determining, based on the adjacent relationship and the spare extents, an extent for building the target stripe.

In a second aspect of embodiments of the present disclosure, there is provided a device for managing RAID. The device includes at least one processor and at least one memory including a computer program instruction. The at least one memory and the computer program instruction are configured, together with the at least processor, to cause an electronic device to execute acts of: in response to a target stripe to be built in the RAID, determining, from a resource pool, whether there are spare extents associated with at least one system disk; in response to determining that there are the spare extents associated with at least one system disk, determining an adjacent relationship of used extents associated with the at least one system disk within a RAID stripe; and determining, based on the adjacent relationship and the spare extents, an extent for building the target stripe.

In a third aspect of the present disclosure, there is provided a computer program product, which is tangibly stored on a non-transient computer readable medium and includes a machine executable instruction, the machine executable instruction, when executed, causing a machine to execute the steps of the method of the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features and advantages of example embodiments of the present disclosure will become more apparent. Several example embodiments of the present disclosure will be illustrated by way of example but not limitation in the drawings in which.

DETAILED DESCRIPTION OF EMBODIMENTS

Figure 1:
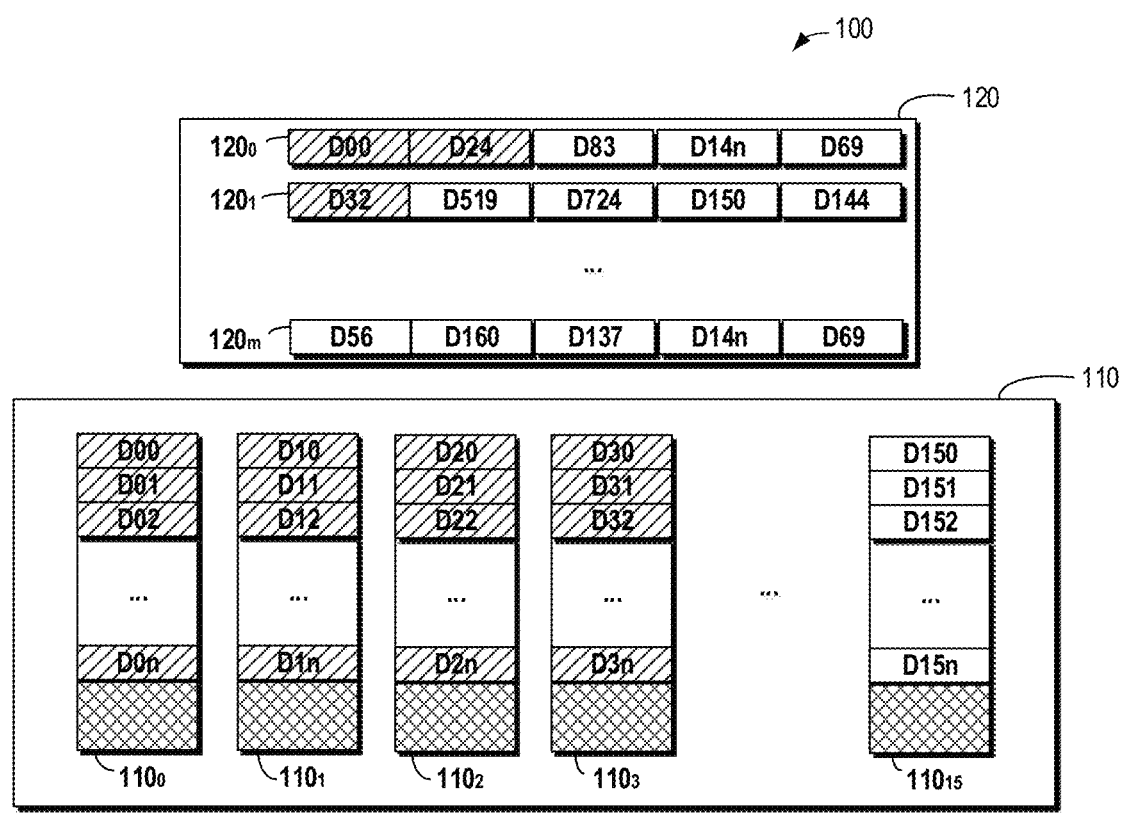
FIG. 1 illustrates a diagram of an example operating environment 100 in which the embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Various example embodiments of the present disclosure will be described below with reference to the accompanying drawings. It should be appreciated that these drawings and description are only about example embodiments. It should be pointed out that alternative embodiments of the structure and method disclosed herein would be conceivable according to the following description, and these alternative embodiments may be employed without departing from principles as disclosed herein.

It is to be understood these example embodiments are discussed only for the purpose of enabling those skilled persons in the art to better understand and thus implement the present disclosure, rather than suggesting any limitations on the scope of the present disclosure.

As used herein, the term "includes" and its variants are to be read as open-ended terms that mean "includes, but is not limited to." The term "based on" is to be read as "based at least in part on." The terms "one example embodiment" and "one embodiment" are to be read as "at least one example embodiment." The term "another embodiment" is to be read as "at least one another embodiment."

As mentioned above, mapped RAID is a new RAID technology. Unlike the conventional RAID, the mapped RAID is built on top of a pool comprised of a plurality of disks, rather than on several particular disks. A disk in the pool is divided into a series of non-overlapping segments each having a fixed size, which can be referred to as disk extents. Therefore, the pool can be regarded as a set of disk extent resources. The mapped RAID is comprised of a group of RAID stripes. Each RAID stripe can be regarded as a conventional RAID. Taking R5 of 4D+1P as an example, each RAID stripe includes 5 disk extents, and the 5 disk extents are allocated from 5 different disks, in which 4 disk extents are provided for storing user data, and one disk extent is provided for storing parity data.

FIG. 1 illustrates a diagram of an example operating environment 100 that may implement embodiments of the present disclosure. The environment 100 includes a pool 110 and RAID 120 built on the pool 110. The pool 100 includes disks $110_0$, $110_1$, $110_2$ ... $110_{15}$. That is, the pool 110 includes 16 disks. The number of the disks in the pool 110 is determined by the adopted RAID policy. For example, when the R5 policy of 4D+1P is adopted, n is an integer greater than or equal to 5, and when the R6 policy of 4D+2P is adopted, n is an integer greater than or equal to 6. Thus, it would be appreciated that the number of disks as shown in FIG. 1 is provided merely as an example for describing embodiments of the present disclosure, without any intention of limiting the embodiments of the present disclosure. Each of the disks $110_0$, $110_k$, $110_2$ ... $110_{15}$ in the pool 110 is divided into a series of non-overlapping extents having a fixed size; these extents can be referred to as disk extents. In actual implementations, depending on the limit on storage, the disk extents can be set with a different size.

In the environment 100 as shown in FIG. 1, the RAID 120 as shown therein is built based on the disks $110_0$, $110_1$, $110_2$ ... $110_{15}$ in the pool 110. The logical space of the RAID 120 built on the basis of disks $110_0$, $110_1$, $110_2$ ... $110_{15}$ in the pool 110 is divided into a group of continuous non-overlapping stripes which can be referred to as RAID stripes. For example, the RAID 120 in FIG. 1 includes a group of RAID stripes $120_0$, $120_1$ ... $120_m$ which are referred to as RAID stripes. For example, the RAID 120 in FIG. 1 includes RAID stripes $120_0$, $120_1$ ... $120_m$, where m represents the number of RAID stripes included in the RAID 120. Each of the RAID stripes $120_0$, $120_1$ ... $120_m$ is comprised of a predetermined number of disk extents selected from different disks $110_0$, $110_1$, $110_2$ ... $110_{15}$. The predetermined number depends on the selected RAID policy. Taking the R5 of 4D+1P as an example, each RAID stripe includes 5 disk extents allocated from 5 different disks, in which 4 disk extents are provided for storing user data and one disk extent is provided for storing parity data, and in the circumstance, the predetermined number is 5. It would be appreciated by those skilled in the art that the numerical value 5 is provided only as an example, and the predetermined number having different values may be selected according to different RAID policies.

In the environment 100 as shown in FIG. 1, the RAID stripe $120_0$ as shown is comprised of a disk extent D00 of the disk $110_0$, a disk extent D24 of the disk $110_2$, a disk extent D83 of the disk $110_8$, a disk extent D14n of the disk $110_{14}$ and a disk extent D69 of the disk $110_6$.

As mentioned above, disks in a resource pool may include system disks and user disks. Particular spaces on system disks are reserved for storing software and metadata of some initial space of private management file systems. The rest of the space of the system disks may be user portions. In the environment 110 as shown in FIG. 1, the disks $110_0$, $110_1$, $110_2$ and $110_3$ may be regarded as system disks, while the disks $110_4$ to $110_{15}$ may be taken as user disks. In FIG. 1, in order to differentiate extents associated with the system disks $110_0$ to $110_3$ in the resource pool 110 from extents associated with user disks $110_4$ to $110_{15}$ in the resource pool 110, the slashed disk segments represent extents associated with the system disks $110_0$ to $110_3$ in the resource pool 110, such as the extent D00.

All of the RAID stripes built by the extents associated with both the system disks $110_0$ to $110_3$ in the resource pool 110 and the user disks $110_4$ to $110_{15}$ in the resource pool 110 can process user IOs. The term "disk credits" is introduced herein. The term "disk credits" represents a number of IOs that a disk is capable of processing once. However, the credit of each disk is fixed. Since a part of the credits in the system disks is dedicated to system IO processing, there are fewer credits left for processing user IO in the system disks. In this case, for example, on the RAID stripe $120_1$, the speed of the extent D32 for processing the user IOs is lower than the speed of the extents associated with the user disks on the stripe for processing the user IOs, such as the speed of the extents D519, D724 and the like for processing the user IOs.

Figure 2:
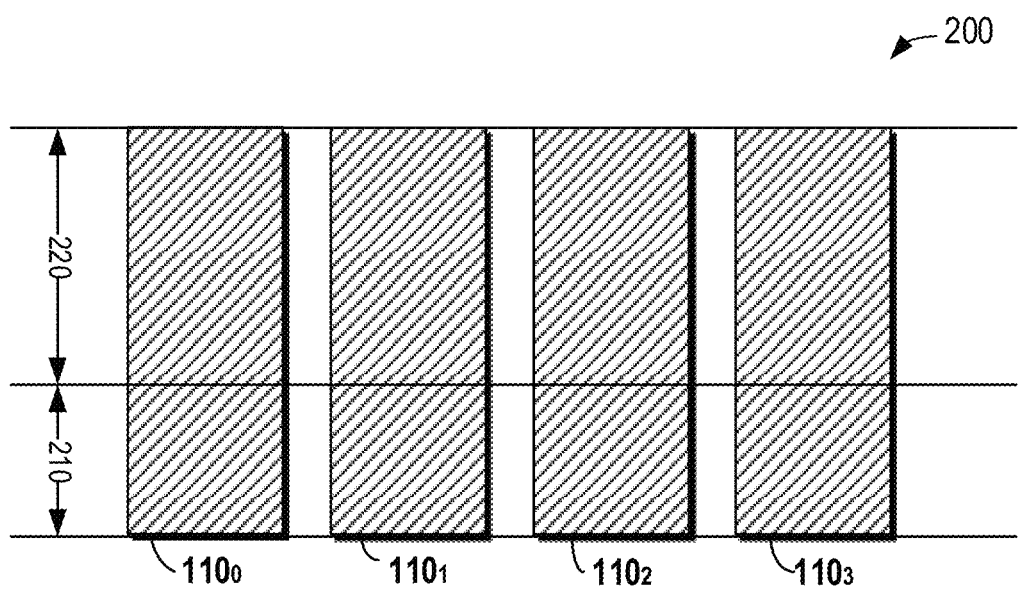
FIG. 2 illustrates a diagram of credits of system disks according to embodiments of the present disclosure.

FIG. 2 illustrates a diagram of credits 200 of a system disk according to embodiments of the present disclosure. For the system disks $110_0$ to $110_3$, there are credits 210 for processing system IOs and credits 220 for processing user IOs on each of the disks $110_0$ to $110_3$. That is, only some of IOs on each system disk are provided for processing user IOs.

When the RAID stripes $120_0$, $120_1$ . . . $120_m$ are created, the extents associated with which disks in the disks $110_0$, $110_1$, $110_2$ . . . $110_{15}$ are selected to build the RAID stripes $120_0$, $120_1$ . . . $120_m$ may be determined based on an extent consumed ratio of each of the disks $110_0$, $110_1$, $110_2$ . . . $110_{15}$. That is, the extents associated with the disks having more free space thereon are selected to build the RAID stripes. A consumed array indicating an extent consumed ratio of each of the disks $110_0$, $110_1$, $110_2$ . . . $110_{15}$ in the resource pool 110 may act as a criterion to select extents for each RAID stripe.

In addition, when the RAID stripes $120_0$, $120_1$ . . . $120_m$ are created, a so-called neighborhood matrix algorithm is used to enable the disk extents included in the RAID stripes $120_0$, $120_1$ . . . $120_m$ to be distributed evenly as much as possible. The neighborhood matrix M is a square matrix of N*N, where N is the number of disks in the pool, which depends on the adopted RAID policy, as discussed above. Each element M (i, j) in the matrix represents the number of times disk i is a neighbor of disk j, that is, the number of times that disk extents in the disk i and disk extents in the disk j appear simultaneously in the same RAID stripe. If one disk extent of the disk i and one disk extent of the disk j appear simultaneously in the same RAID stripe, the disk i and the disk j are defined as having neighbored once. For example, in the environment 100 as shown in FIG. 1, the RAID stripe $120_0$ is comprised of the disk extent D00 of the disk $110_0$, the disk extent D24 of the disk $110_2$, the disk extent D83 of the disk $110_8$, the disk extent D14n of the disk $110_{14}$ and the disk extent D69 of the disk $D110_6$. Correspondingly, the disk $110_0$ is adjacent to the disk $110_2$, the disk $110_8$, the disk $110_{14}$ and the disk $110_6$, respectively, and the disk $110_2$ is adjacent to the disk $110_0$, the disk $110_8$, the disk $110_{14}$ and the disk $110_6$, respectively, and so forth. From the definition of the neighborhood matrix, it can be concluded that the neighborhood matrix is a symmetric matrix.

Figures 3A, 3B:
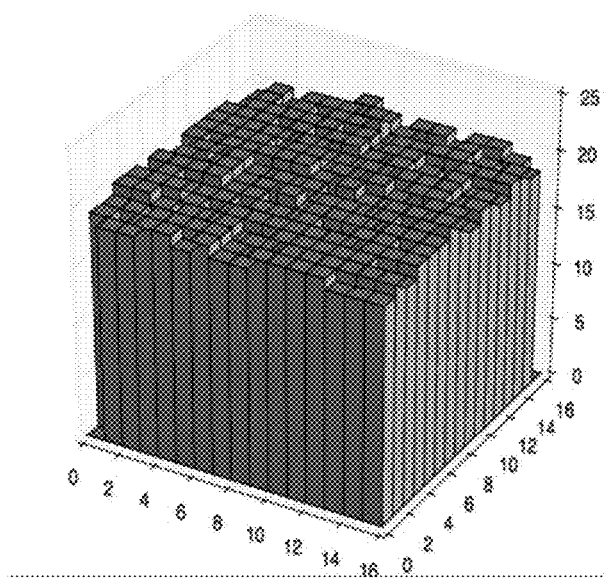
FIG. 3a visually illustrates a diagram of a neighborhood matrix corresponding to evenly distributed RAID in two dimensions.
FIG. 3b visually illustrates a diagram of a neighborhood matrix corresponding to evenly distributed RAID in three dimensions.

If the disk extents included in the RAID stripes $120_0$, $120_1$ . . . $120_m$ are distributed evenly over the pool 110, elements in the neighborhood matrix M should be close to one another. Therefore, the objective of the neighborhood matrix algorithm is enabling each element in the neighborhood matrix M to be substantially identical after an allocation of RAID stripe is completed. FIG. 3a and FIG. 3b visually illustrate a neighborhood matrix in which each element is substantially the same, respectively in two dimensions and three dimensions. In the examples of FIGS. 3a and 3b, the number N of the disks in the pool 110 is 16 which is provided merely as an example, and N may be set to a different value according to the adopted RAID policy. As shown in FIGS. 3a and 3b, after performing the neighborhood matrix algorithm, the value of each element in the matrix is substantially the same, that is, the corresponding RAID in the neighborhood matrix as shown in FIGS. 3a and 3b are distributed evenly over the pool.

However, even though the algorithms of the consumed matrix and the neighborhood matrix, as mentioned above, are used to create the RAID stripes $120_0$, $120_1$ . . . $120_m$, the speeds for processing user IOs on the extents of the same stripe are not balanced due to the simultaneous presence of the extents associated with the system disks and that of the extents associated with the user disks on the same RAID stripe. This deteriorates the performance of the system.

Figure 4:
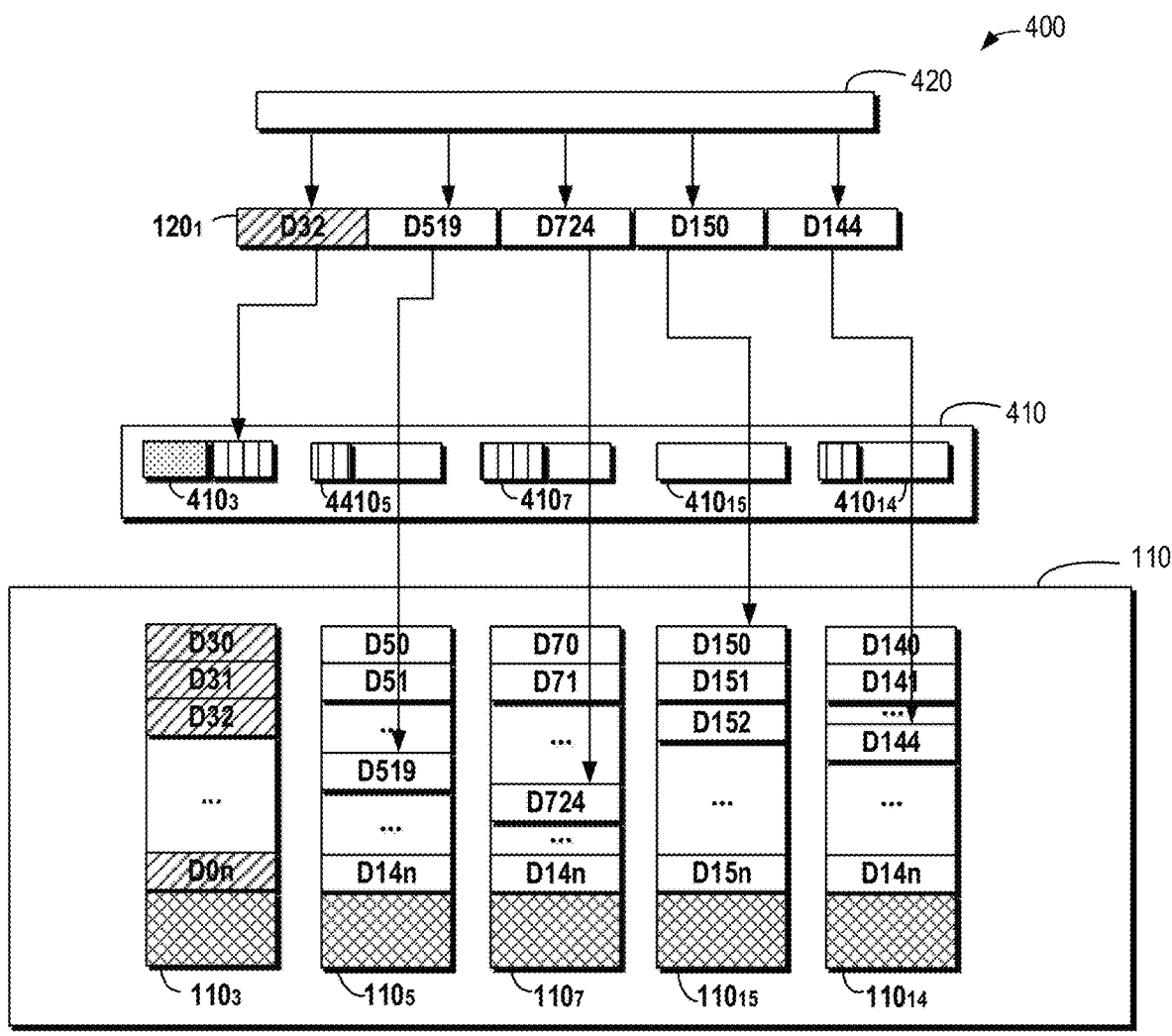
FIG. 4 illustrates an example operating environment 400 according to embodiments of the present disclosure.

FIG. 4 illustrates a diagram of an example operating environment 400 according to embodiments of the present disclosure. As shown in FIG. 4, the RAID stripe $120_1$ includes the extent D32 from the disk $110_3$, the extent D519 from the disk $110_5$, the extent D724 from the disk $110_7$, the extent D150 from the disk $110_{15}$ and the extent D144 from the extent $110_{14}$. It can be seen that the extent D32 is from the system disk $110_3$. When there is a user IO 420 to be processed, the user IO may be divided into a plurality of sub-IOs so as to be processed on each extent of the RAID stripe $120_1$, respectively. Disk credits 410 demonstrate disk credits of respective disk of each extent of the RAID stripe $120_1$, namely the credit of disk $110_3$, disk $110_5$, disk $110_7$, disk $110_{15}$ and disk $110_{14}$. For ease of description, in the disk credits 410, dotted blocks represent the credits reserved for the system IO, the blocks filled with vertical lines represent occupied credits, and the blank blocks represent available credits. It can be seen that there are available credits on the disk credits $410_5$, $410_7$, $410_{15}$ and $410_{14}$ of the disk $110_5$, disk $110_7$, disk $110_{15}$ and disk $110_{14}$ respectively. Only for the credits $410_3$ of the disk $110_3$, since there are some credits reserved for the system IOs, the credits for processing user IOs have all been occupied. As such, even though sub-user IO requests on the extents D519, D724, D150 and D144 forming the RAID stripe $120_1$ have all been processed, the current processing process of user IO still cannot be ended because the credits $410_3$ of the disk $110_3$ have no free credits for processing the user IO. In other words, the extent D32 on the RAID stripe $120_1$ will affect the processing performance of the entire stripe.

In order to solve the foregoing problem, a method of managing RAID is provided. The method can reduce the total number of RAID stripes of extents associated with a system disk as many as possible, thereby decreasing the number of RAID stripes affected by the low performance of processing the user IO provided by the system disk, which in turn will improve the overall performance of RAID.

The method of managing RAID for implementing the present disclosure will be further described with reference to FIGS. 5-10. It would be appreciated that the method as described in FIGS. 5-10 is applicable to the environment 100 as shown in FIG. 1. For ease of description, some reference symbols in FIG. 1 are still employed when the method shown in FIGS. 5-10 is described.

Figures 5, 6:
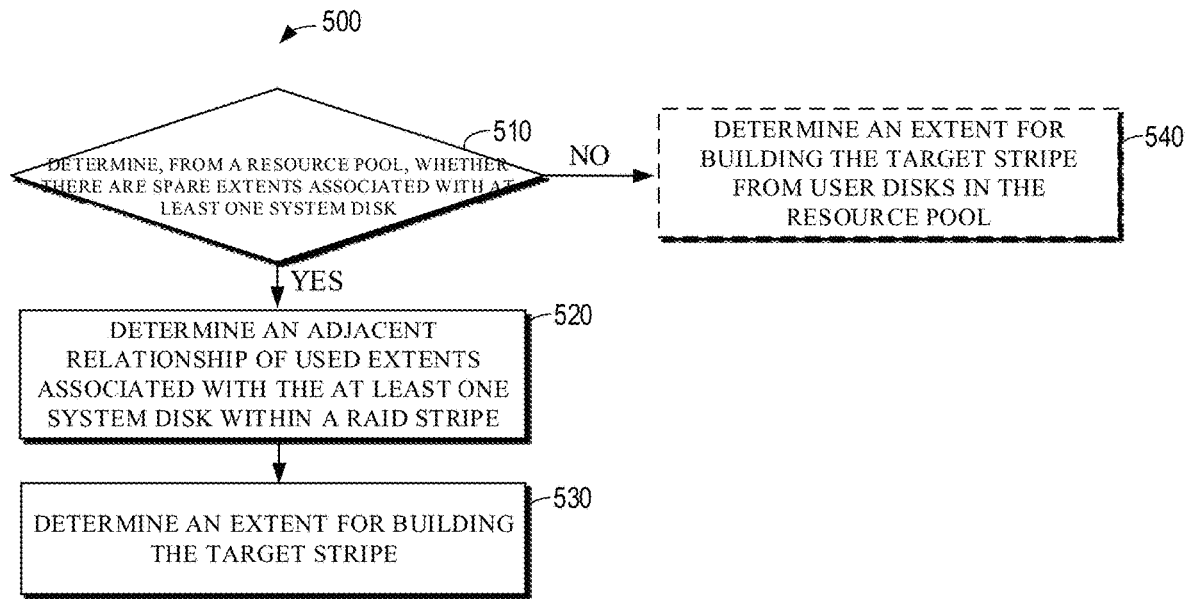
FIG. 5 illustrates a flowchart of a method 500 of managing RAID.
FIG. 6 visually illustrates a diagram of the neighborhood matrix corresponding to RAID before implementing the method according to embodiments of the present disclosure, in two dimensions.

FIG. 5 illustrates a flowchart of a method 500 of managing RAID according to the embodiments of the present disclosure.

At block 510, if a target stripe is to be built in the RAID 120, whether there are spare extents associated with at least one system disk is determined from a resource pool 110. The target stripe may be any one of the RAID stripes $120_0$, $120_1$ . . . $120_m$ in the RAID 120 in FIG. 1.

According to some embodiments, the at least one system disk includes a plurality of system disks, such as the system disks $110_0$ to $110_3$ as shown in FIG. 1. As such, determining whether there are spare extents associated with at least one system disk may include determining, from the resource pool 110, whether there are spare extents associated with the plurality of system disks $110_0$ to $110_3$. If there are spare extents associated with the plurality of system disks $110_0$ to $110_3$, information indicating a size of the spare extents associated with the system disks $110_0$ to $110_3$ may be obtained. The information can be understood as the consumed array as mentioned above. If the size of the spare extents associated with one of the plurality of system disks $110_0$ to $110_3$, for example the size of the spare extents associated with the disk $110_3$, exceeds a threshold size, the spare extents associated with the disk $110_3$ are determined as the extent for building the target stripe (for example, the stripe $120_1$ in FIG. 1).

According to some embodiments, that the size of the spare extents associated with the disk $110_3$ exceeds a threshold size may be read as that the size of the spare extents included in the disk $110_3$ is the largest among those of the plurality of system disks $110_0$ to $110_3$. In other words, the disk $110_3$ is most idle among the plurality of system disks $110_0$ to $110_3$.

According to some embodiments, after the spare extents on the disk $110_3$ are selected, the information indicating the size of the spare extents associated with the plurality of system disks $110_0$ to $110_3$ is updated.

If there are spare extents, an adjacent relationship of used extents associated with the at least one system disk within the RAID stripe is determined at block 520.

According to some embodiments, determining the adjacent relationship of the used extents associated with the at least one system disk within the RAID stripe may include determining, from the at least one system disk, a system disk corresponding to a first used extent. For example, in FIG. 1, it is determined that the system disk corresponding to the extents D32 in the strip $120_1$ is the disk $110_3$.

According to some embodiments, determining the adjacent relationship of the used extents associated with the at least one system disk may include determining the adjacent relationship between the first used extent and spare extents associated with other system disks $110_0$ to $110_2$ in the at least one system disk. For example, the conditions of spare extents on other system disks adjacent to the disk $110_3$ are determined.

According to some embodiments, specifically, determining the adjacent relationship of the used extents associated with at least one system disk within the RAID stripe may include building a neighborhood matrix for the resource pool 110, for example the neighborhood matrix as shown in FIG. 3a. The element in the neighborhood matrix indicates how many times one disk in the resource pool 110 has ever been a neighbor of another one over a historical period. The adjacent relationship of the disks associated with the used extents with other disks associated with spare extents can be searched through the neighborhood matrix.

At block 530, based on the adjacent relationship and the spare extents, an extent for building a target strip is determined.

According to some embodiments, determining the extent for building the target stripe based on the adjacent relationship and the spare extents may include determining a first number of system disks in the resource pool, and determining a second number of system disks associated with the target stripe. The first number and the second number are compared, and if the second number is less than the first number, the extent for building the target stripe may be determined from the spare extents. If the second number is equal to the first number, the extent for building the target stripe can be determined from user disks $110_4$ to $110_{15}$ in the resource pool 110.

According to some embodiments, if the second number is less than the first number, the extent for building the target stripe can be determined from the spare extents based on the adjacent relationship. According to some embodiments, a score of each system disk in the system disks associated with the spare extents can be calculated, and an extent of the system disk having the lowest score is selected as the extent for building the target stripe from the system disks associated with the spare extents.

Take the neighborhood matrix as shown in FIG. 3a for example, and it is assumed that the RAID stripe $120_1$ occupies an extent D32 associated with the disk $110_3$, and the adjacent values of other system disks $110_0$ to $110_2$ with respect to the disk $110_3$ are represented as V1. It can be seen from the neighborhood matrix that the adjacent scores of the disks $110_0$ to $110_2$ (corresponding to the disks 1 to 3 in FIG. 3a, respectively) with respect to the disk $110_3$ (corresponding to the disk 4 in FIG. 3a) are 020, 019, 020, respectively. Therefore, the extents in the disk 2, namely the disk $110_1$, can act as the extent for building the target stripe.

Now returning to block 510, if it is determined that there is no spare extent associated with at least one system disk, and block 540, it is determined there is no spare extent associated with at least one system disk, the extent for building the target stripe can be determined from user disks (disks $110_4$ to $110_{15}$ in FIG. 1) in the resource pool.

According to some embodiments, determining the extent for building the target stripe from the user disks in the resource pool may include obtaining information indicating a size of spare extents associated with the user disks. If the size of the first user disk associated with the spare extent in the user disks exceeds a threshold size, the spare extents associated with the first user disk can be determined as the extent for building the target stripe.

According to some embodiments, determining the extent for building the target stripe from user disks in the resource pool may include determining an adjacent relationship of used extents associated with user disks within the RAID stripe. Based on the adjacent relationship and spare extents associated with the user disks, the extent for building the target stripe is determined.

According to some embodiments, determining the adjacent relationship of used extents associated with user extents within the RAID stripe may include determining a user disk corresponding to a first used extent from the user disks and determining an adjacent relationship between the first used extent and spare extents associated with other user disks in the user disks.

It would be appreciated that determining the extent for building the target stripe from the user disks (disks $110_4$ to $110_{15}$ in FIG. 1) from the resource pool 110 is similar to determining the counterpart from the system disks (disks $110_0$ to $110_3$ in FIG. 1) in the resource pool 110, which is omitted herein.

Figure 7:
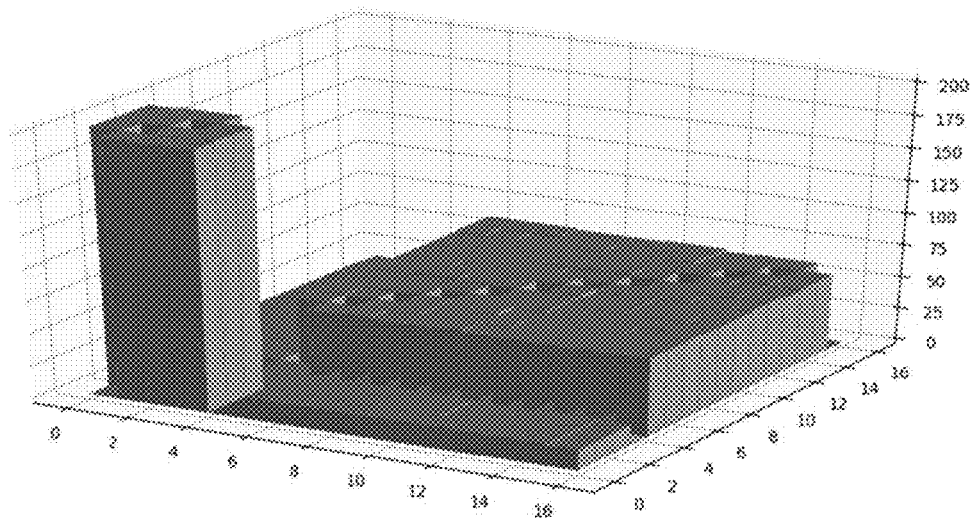
FIG. 7 visually illustrates a diagram of the neighborhood matrix corresponding to RAID after implementing the method according to embodiments of the present disclosure, in three dimensions.

FIG. 6 visually illustrates a diagram of the neighborhood matrix corresponding to RAID before implementing the method according to the embodiments of the present disclosure, in two dimensions. FIG. 7 visually illustrates a diagram of the neighborhood matrix corresponding to RAID after implementing the method according to the embodiments of the present disclosure, in three dimensions. As can be seen from FIGS. 6 and 7, when building the RAID stripe, different manners are used for selecting the spare extents associated with the system disks and the spare extents associated with the user disks, such that the spare extents associated with the system disks are selected prior to the spare extents associated with the user disks are selected for building the RAID stripe. As such, the total number of the RAID stripes including extents associated with the system disks is reduced significantly. Meanwhile, the method according to the present disclosure can ensure that the spare extents associated with the system disks and the spare extents associated with the user disks are evenly occupied.

Figure 8A:
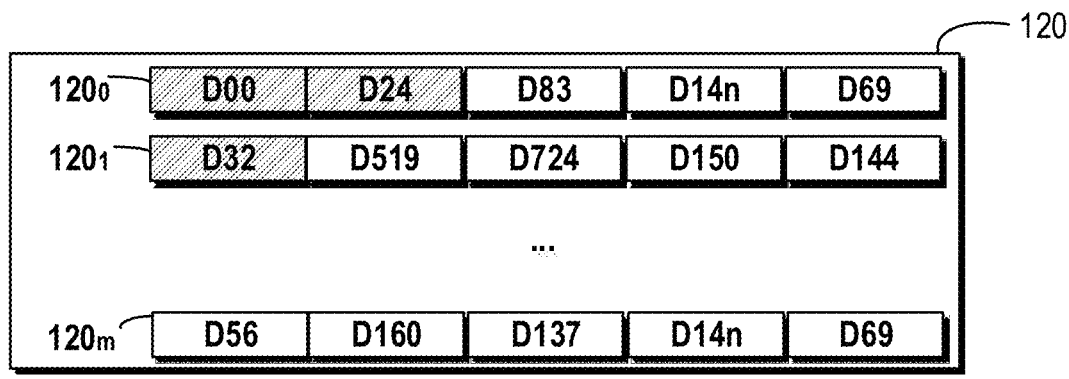
FIG. 8a illustrates a diagram of distribution of extents of a RAID stripe before implementing the method according to embodiments of the present disclosure.
Figure 8B:
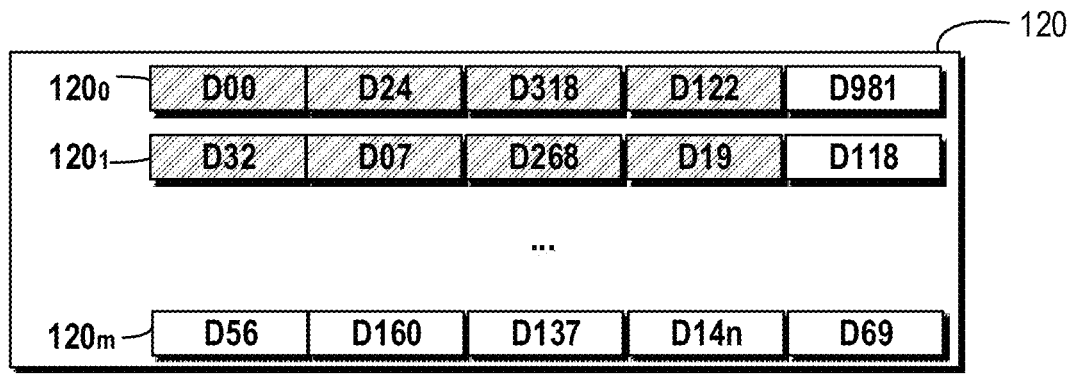
FIG. 8b illustrates a diagram of distribution of extents of a RAID stripe after implementing the method according to embodiments of the present disclosure.

FIG. 8a illustrates a diagram of distribution of extents of a RAID stripe before implementing the method according to the embodiments of the present disclosure. FIG. 8b illustrates a diagram of distribution extents of a RAID stripe after implementing the method according to the embodiments of the present disclosure. It can be seen from FIGS. 8a and 8b that comparing with FIG. 8a, on the same RAID stripe in FIG. 8b, for example stripes $120_0$ and $120_1$, there are as many extents associated with the system disks as possible. Hence, it is predictable that the number of the RAID stripes including extents associated with the system disks in FIG. 8b is less than the number of the RAID stripes including extents associated with the system disks in FIG. 8a.

Figure 9:
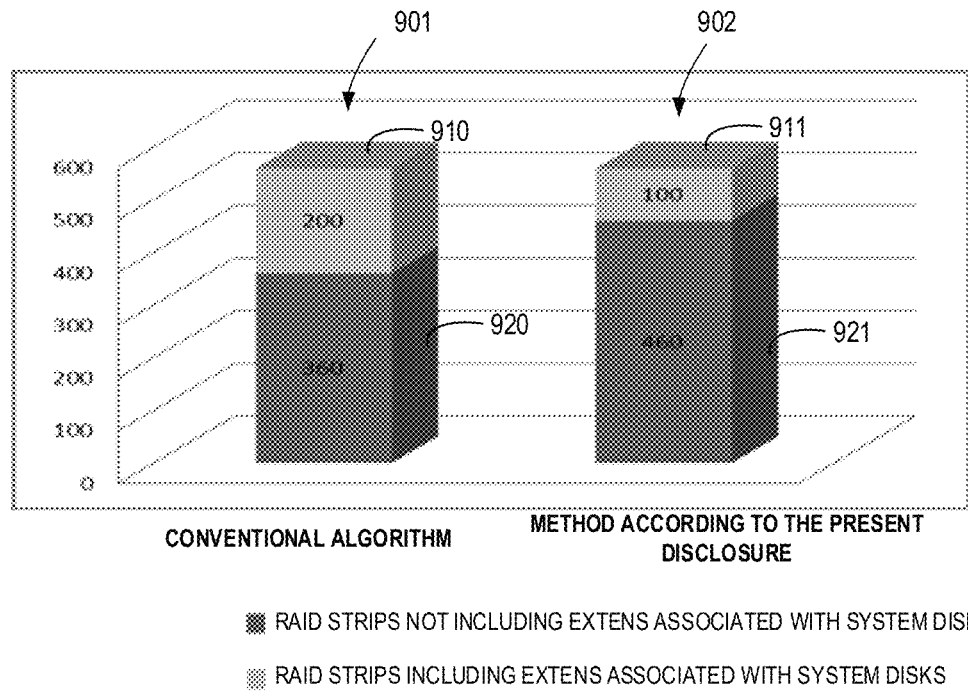
FIG. 9 illustrates a comparison chart of total numbers of stripes including extents associated with system disks after implementing a conventional algorithm and after implementing the method according to embodiments of the present disclosure.

FIG. 9 illustrates a comparison chart of total numbers of stripe extents associated with a system disk after implementing a conventional algorithm and after implementing the method according to embodiments of the present disclosure. Comparing with the RAID group 901 built with the conventional algorithm, the RAID group 902 built with the algorithm according to the present disclosure includes a smaller number of RAID stripes 911 including extents associated with the system disks. For example, it can be seen that, in the RAID group 901, the number of RAID stripes 910 including extents associated with the system disks is 200, while in the RAID group 902, the number of RAID stripes 911 including extents associated with the system disks is 100.

Through the method of managing RAID according to the embodiments of the present disclosure, an algorithm that optimizes the distribution of extents is provided for the mapped RAID, which can reduce the number of the RAID stripes including the extents associated with the system disks, thereby increasing the number of RAID stripes built only by the extents associated with the user disks.

Thus, the advantageous effects are as follows: the capacity of system disks can be better used; all the spare extents associated with the system will be involved into RAID strips. By reducing the total number of RAID extents containing extents associated with the system disks, the performance of the entire RAID group is improved. Since the total capacity of resource pool is fixed, reducing the number of the RAID stripes containing extents associated with the system disks will in turn increase the number of the RAID stripes built only by the extents associated with the user disks, which ultimately improve the overall performance of the entire RAID group.

In addition, by using the optimized algorithm following the concept of consumed array and neighbourhood matrix, it can separately ensure that spare extents associated with system disks and spare extents associated with user disks can be evenly used for building the RAID stripes.

Further, even though the width of a RAID group is larger than the number of system disks (for example, in the case of RAID 5, the number of system disks is only 4), the optimized algorithm still follows the concept of consumed array and neighborhood matrix when selecting extra user extents, which still makes balance of the spare extents associated with user disks for building an RAID stripe.

Figure 10:
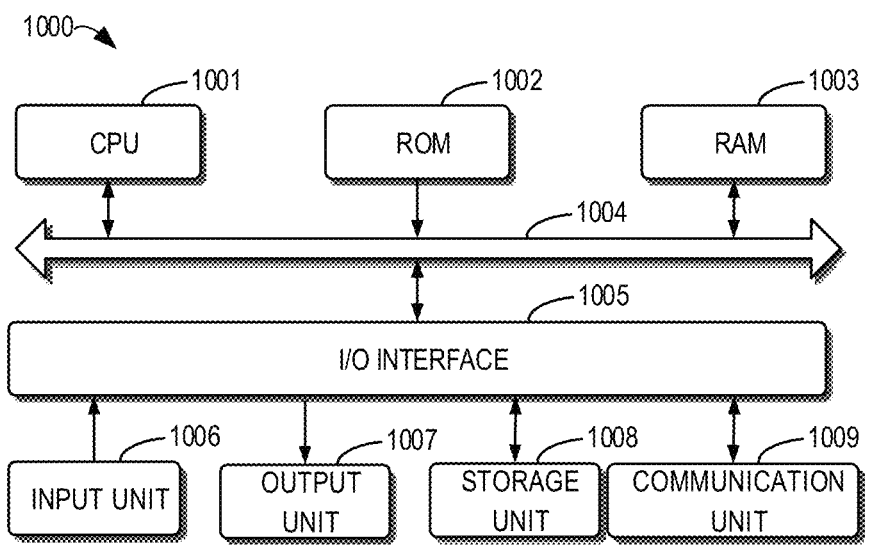
FIG. 10 illustrates a block diagram of an example device 1100 that may implement embodiments of the present disclosure.

FIG. 10 illustrates a diagram of a device 1000 that may implement embodiments of the present disclosure. As shown, the device 1000 includes a central processing unit (CPU) 1001 that may perform various appropriate acts and processing based on computer program instructions stored in a read-only memory (ROM) 1002 or computer program instructions loaded from a storage unit 1004 to a random access memory (RAM) 1003. In the RAM 1003, there further store various programs and data needed for operations of the device 1000. The CPU 1001, ROM 1002 and RAM 1003 are connected to each other via a bus 1004. An input/output (I/O) interface 1005 is also connected to the bus 1004.

The following components in the device 1000 are connected to the I/O interface 1005: an input unit 1006, such as a keyboard, a mouse and the like; an output unit 1007, such as various kinds of displays and a loudspeaker, etc.; a storage unit 1008, such as a magnetic disk, an optical disk, and etc.; a communication unit 1009, such as a network card, a modem, and a wireless communication transceiver, etc. The communication unit 1009 allows the device 1000 to exchange information/data with other devices through a computer network such as Internet and/or various kinds of telecommunications networks.

Various processes and processing described above, e.g., the method 500, may be executed by the processing unit 1001. For example, in some embodiments, the method 500 may be implemented as a computer software program that is tangibly embodied on a machine readable medium, e.g., the storage unit 1004. In some embodiments, part or all of the computer programs can be loaded and/or mounted onto the device 1000 via the ROM 1002 and/or communication unit 1009. When the computer program is loaded to the RAM 1003 and executed by the CPU 1001, one or more steps of the method 500 as described above may be executed.

The present disclosure is directed to a method, a device, a system and/or a computer program product. The computer program product may include a computer readable storage medium on which computer readable program instructions are carried out for performing each aspect of the present application.

The computer readable storage medium may be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which includes one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing redundant arrays of independent disks (RAID), comprising:
   in response to a target stripe to be built in the RAID, determining, from a resource pool including at least one system disk and at least one user disk, wherein the at least one system disk in the resource pool includes spaces reserved for storing software and metadata of management file systems, whether there are spare extents associated with the at least one system disk;
   in response to determining that there are the spare extents associated with the at least one system disk, determining an adjacent relationship of used extents associated with the at least one system disk within a RAID stripe; and
   determining, based on the adjacent relationship and the spare extents, an extent for building the target stripe.

2. The method of claim 1, wherein the at least one system disk comprises a plurality of system disks, determining, from the resource pool, whether there are spare extents associated with the at least one system disk, comprising:
   determining, from the resource pool, whether there are spare extents associated with the plurality of system disks;

in response to determining that there are the spare extents associated with the plurality of system disks, obtaining information indicating a size of spare extents associated with the plurality of system disks; and in response to the size exceeding a threshold size, determining the spare extents associated with the plurality of system disks as the extent for building the target stripe.

3. The method of claim 1, wherein the at least one system disk in the resource pool comprises a plurality of system disks, and wherein determining the adjacent relationship comprises:

determining, from among the plurality of system disks in the resource pool, a system disk corresponding to a first used extent; and determining the adjacent relationship between the first used extent and spare extents associated with system disks in the resource pool other than the system disk corresponding to the first used extent.

4. The method of claim 1, wherein determining the extent for building the target stripe comprises:

determining a first number of system disks in the resource pool;

determining a second number of system disks associated with the target stripe;

in response to the second number being less than the first number, determining the extent for building the target stripe from the spare extents; and in response to the second number being equal to the first number, determining the extent for building the target stripe from the user disk in the resource pool.

5. The method of claim 1, further comprising:

in response to determining there is no spare extent associated with the at least one system disk, determining, from the user disk in the resource pool, the extent for building the target stripe.

6. The method of claim 5, wherein determining the extent for building the target stripe comprises:

obtaining information indicating a size of spare extents associated with the user disk; and in response to the size exceeding a threshold size, determining the spare extents associated with the user disk as the extent for building the target stripe.

7. The method of claim 5, wherein determining the extent for building the target stripe comprises:

determining an adjacent relationship of used extents associated with the user disk within the RAID stripe; and determining, based on the adjacent relationship and spare extents associated with the user disk, the extent for building the target stripe.

8. The method of claim 7, wherein the at least one user disk in the resource pool comprises a plurality of user disks, and wherein determining the adjacent relationship comprises:

determining, from among the plurality of user disks in the resource pool, a user disk corresponding to a first used extent; and determining the adjacent relationship between the first used extent and spare extents associated with user disks in the resource pool other than the user disk corresponding to the first used extent.

9. The method of claim 7, wherein determining the adjacent relationship of the used extents associated with the at least one system disk within the RAID stripe includes building a neighborhood matrix for the resource pool.

10. A device for managing redundant arrays of independent drives (RAID), comprising:

at least one processor; and a memory coupled with the at least one processor, the memory including an instruction stored therein, the instruction, when executed by the at least one processor, causing the device to execute acts of:

in response to a target stripe to be built in the RAID, determining, from a resource pool including at least one system disk and at least one user disk, wherein the at least one system disk in the resource pool includes spaces reserved for storing software and metadata of management file systems, whether there are spare extents associated with the at least one system disk;

in response to determining that there are the spare extents associated with the at least one system disk, determining an adjacent relationship of used extents associated with the at least one system disk within a RAID stripe; and determining, based on the adjacent relationship and the spare extents, an extent for building the target stripe.

11. The device of claim 10, wherein the at least one system disk comprises a plurality of system disks, determining, from a resource pool, whether there are spare extents associated with at least one system disk, comprising:

determining, from the resource pool, whether there are spare extents associated with the plurality of system disks;

in response to determining that there are the spare extents associated with the plurality of system disks, obtaining information indicating a size of spare extents associated with the plurality of system disks; and in response to the size exceeding a threshold size, determining the spare extents associated with the plurality of system disks as the extent for building the target stripe.

12. The device of claim 10, wherein the at least one system disk in the resource pool comprises a plurality of system disks, and wherein determining the adjacent relationship comprises:

determining, from among the plurality of disks in the resource pool, a system disk corresponding to a first used extent; and determining, the adjacent relationship between the first used extent and spare extents associated with system disks in the resource pool other than the system disk corresponding to the first used extent.

13. The device of claim 10, wherein determining the extent for building the target stripe comprises:

determining a first number of system disks in the resource pool;

determining a second number of system disks associated with the target stripe;

in response to the second number being less than the first number, determining the extent for building the target stripe from the spare extents; and in response to the second number being equal to the first number, determining the extent for building the target stripe from the user disk in the resource pool.

14. The device of claim 10, further comprising:

in response to determining there is no spare extent associated with the at least one system disk, determining, from the user disk in the resource pool, the extent for building the target stripe.

15. The device of claim 14, wherein determining the extent for building the target stripe comprises:
  obtaining information indicating a size of spare extents associated with the user disk; and
  in response to the size exceeding a threshold size, determining the spare extents associated with the user disk as the extent for building the target stripe.

16. The device of claim 14, wherein determining the extent for building the target stripe comprises:
  determining an adjacent relationship of used extents associated with the user disk within the RAID stripe; and
  determining, based on the adjacent relationship and spare extents associated with the user disk, the extent for building the target stripe.

17. The device of claim 16, wherein the at least one user disk in the resource pool comprises a plurality of user disks, and wherein determining the adjacent relationship comprises:
  determining, from among the plurality of user disks in the resource pool, a user disk corresponding to a first used extent; and
  determining the adjacent relationship between the first used extent and spare extents associated with user disks in the resource pool other than the user disk corresponding to the first used extent.

18. A computer program product having a non-transitory computer readable medium which stores a set of instructions to manage redundant arrays of independent disks (RAID); the set of instructions, when carried out by computerized circuitry, causing the computerized circuitry to perform a method of:
  in response to a target stripe to be built in the RAID, determining, from a resource pool including at least one system disk and at least one user disk, wherein the at least one system disk in the resource pool includes spaces reserved for storing software and metadata of management file systems, whether there are spare extents associated with the at least one system disk;
  in response to determining that there are the spare extents associated with the at least one system disk, determining an adjacent relationship of used extents associated with the at least one system disk within a RAID stripe; and
  determining, based on the adjacent relationship and the spare extents, an extent for building the target stripe.

19. The computer program product as in claim 18, further comprising:
  in response to determining the extent for building the target stripe, performing a target stripe build operation that builds the target stripe.

\* \* \* \* \*